United States Patent
Metcalf, Jr.

[15] 3,668,801
[45] June 13, 1972

[54] DEVICE FOR SEPARATING SHRIMP FROM OTHER SEA ANIMALS

[72] Inventor: Charles B. Metcalf, Jr., 3601 Swan Lane, Pensacola, Fla. 32504

[22] Filed: July 6, 1970
[21] Appl. No.: 52,626

[52] U.S. Cl. ............................................................43/17.1
[51] Int. Cl. ......................................................A01k 73/02
[58] Field of Search.................................................43/9, 17.1

[56] References Cited

UNITED STATES PATENTS

| | | |
|---|---|---|
| 3,415,001 | 12/1968 | Ott et al............................43/17.1 |
| 3,475,846 | 11/1969 | Springston, Jr..............................43/9 |
| 3,440,752 | 4/1969 | Minter............................................43/9 |
| 3,312,011 | 4/1967 | Wathne et al................................43/9 |
| 3,483,649 | 12/1969 | Klima et al...................................43/9 |
| 3,491,474 | 1/1970 | Metcalf, Jr...................................43/9 |
| 3,561,150 | 2/1971 | Silchenstedt............................43/17.1 |

FOREIGN PATENTS OR APPLICATIONS 949,531  9/1956  Germany................................43/17.1

*Primary Examiner*—Aldrich F. Medbery
*Attorney*—Hyman Hurvitz

[57] ABSTRACT

A system generally employing a net and an electrical pulse generator that is used for separating shrimp from trash fish, undesirable sea animals and miscellaneous objects. The catch is subjected to an electrical field within the separator which effects only the shrimp. The unwanted portion of the catch not effected by the electrical field passes through the separator and back into the water as it is. No electronarcosis or electrolaxis is produced nor is any of the fish or other undesirables effected in any manner other than possible mechanical diversion, associated with the physical characteristics of the various types and sizes of separators.

3 Claims, 2 Drawing Figures

PATENTED JUN 13 1972　　　　　　　　　　　3,668,801

INVENTOR
CHARLES B. METCALF JR.
Charles B. Metcalf Jr.

DEVICE FOR SEPARATING SHRIMP FROM OTHER SEA ANIMALS

BACKGROUND OF THE INVENTION

It is known that due to the large amount of trash fish, undesirable sea animals, and miscellaneous objects, etc., being caught in the trawling net while attempting to capture shrimp, the job of separating the desired catch from the undesired is laborious and time consuming. It is further known that shrimp can be made to involuntarily propel themselves by applying an electric current through the water in which they are located. This current produces an electrical field of sufficient strength to scare the shrimp but does not produce electronarcosis or electrotaxis. Various pulse generating devices and electrode arrangements are available for producing this effect. For example, U. S. Pat. Nos. 3,312,011 and 3,491,474 deal specifically with equipment and techniques for scaring of shrimp.

If an efficient, practical method of separating the shrimp from the fish were employed, many hours of manual labor would be saved. In addition, such a device would eliminate the killing of fish and sea life, which when dumped overboard contribute to the contamination of the water and beaches. By separating the shrimp and fish underwater while still in the net, the length of time the net can be dragged can be increased significantly; thus adding to the overall efficiency of the operation. At present the physical size of the bag, available power for towing it, limit of the lifting equipment, and damage to the shrimp from being crushed are the limiting factors. It is desirable to drag as long as possible as the time bringing in the nets and putting them out is wasted and requires manpower for performing. Further, areas which are now closed to shrimping because of game fish protection could possibly be opened as nothing but shrimp would be captured by the nets.

It is the intention of this invention to provide such a separator for performing such a feat.

SUMMARY OF THE INVENTION

According to the present invention, fish and shrimp both enter into the net as it is dragged along or near the bottom in the normal manner. The separator panel, which extends from the cork line to the bottom of the net just in front of the bag, is sized such that shrimp will pass through easily, but fish and large objects will not. A trap door is provided on the bottom side of the net just in front of where the separator panel terminates, thus providing an opening for the fish and other undesirable objects to pass through. This opening is provided with an electrode on each of two sides which when excited with power from a pulse generating device such as described in U.S. Pat. No. 3,491,474 will repel any shrimp that did not work their way through the separator panel. The electrical field is designed such that it will not effect fish in any manner. It is specifically tuned and of the correct strength and repetition rate so as to effect shrimp only. Shrimp, being repelled by this field, will become so active that they will force themselves back up into the water and through the separator panel and thus into the bag.

Although this is the preferred arrangement for separation, there could be many variations; for example, a section could be inserted between the net and the bag which could contain electrodes and/or separator mesh or an on-board device could be utilized, providing the shrimp were alive when brought on board. The principal object of this invention is the separation of shrimp from fish due to the behavior of the shrimp when stimulated by an electrical field and the non-effect upon the fish when subjected to the same electrical field.

DESCRIPTION OF THE DRAWINGS

The above and still further objects, features and attendant advantages of the present invention will become apparent from a consideration of the following detailed description of a preferred embodiment thereof, especially when taken in conjunction with the accompanying drawings, in which.

DESCRIPTION OF THE PREFERRED EMBODIMENT

Figure 1:
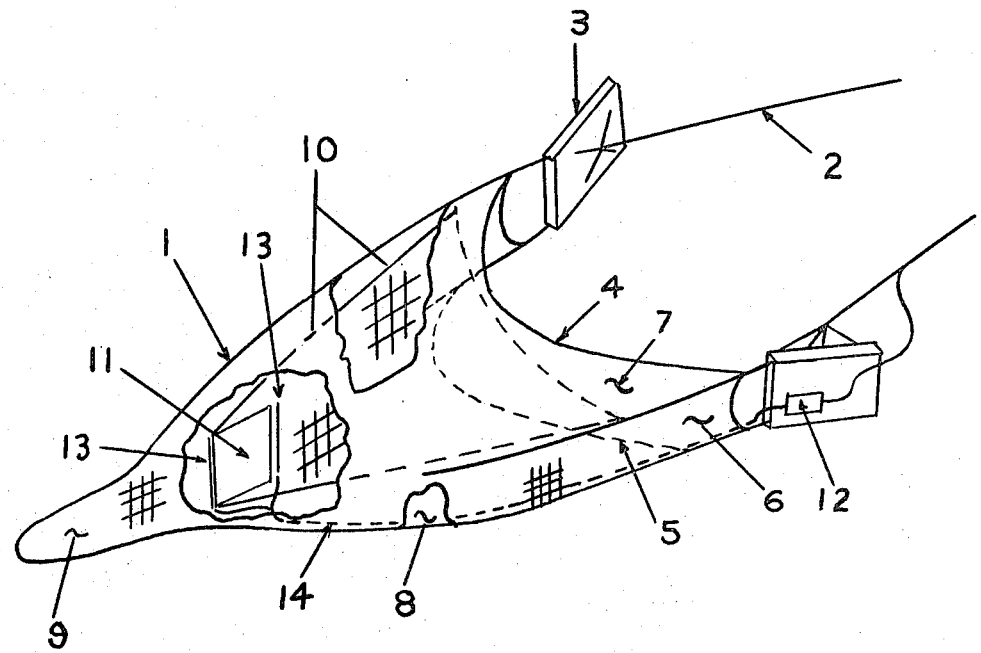
FIG. 1 is a perspective view of a trawl net showing the location of the separator panel, electrified opening, and associated pulse generating equipment.
Figure 2:
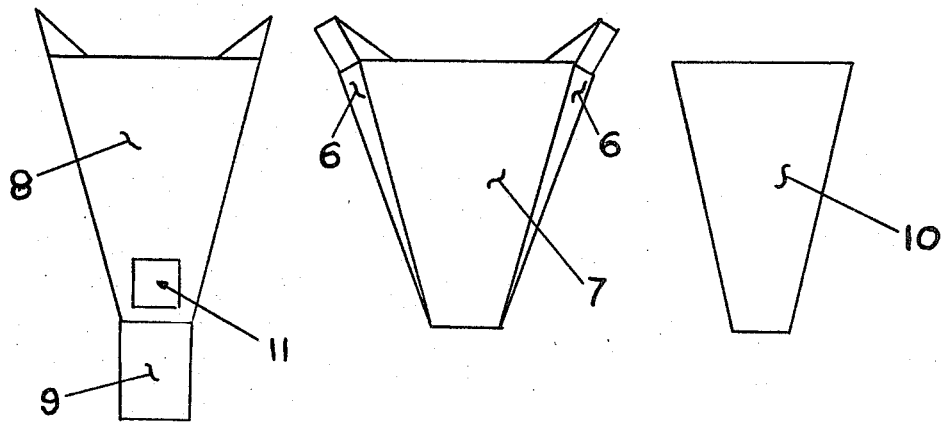
FIG. 2 is a plan view showing the various sections of the net itself.

Reference numeral 1 identifies a trawling net, which normally consists of a wedge-shaped top panel 7 and a similar bottom panel 8, both of which taper to the rear. Suitably shaped wing panels 6 join the top and bottom panels 7 and 8 and these terminate in a bag 9. A headrope 4 equipped with floats is stretched over the front opening of the trawl 1 to maintain the net open in the vertical sense. A footrope 5 is stretched along the lower edge of the opening. The ends of the headrope 4 and footrope 5 are connected to the otter boards, or doors, 3 in a conventional manner. The otter boards 3 are used to provide a force in the horizontal direction for maintaining the net in an open position and are connected to the towing lines 2.

Secured to one of the doors 3 is an electrical pulse generating device 12 that receives its power either from electrical conductors within the towing cable itself 2 or via a separate cable, not shown. The pulse generating device 12 delivers power to the electrodes 13 located on each side of opening 11 which will produce an electrical field that effects shrimp only. All other creatures, objects, etc., will pass through opening 11 unobstructed. The spacing of the electrodes 13, size of the opening 11, size of the mesh for the separator panel 10, and power requirements will be sized in accordance to the ratio of the size of the shrimp to the size of the fish.

While a preferred embodiment of this invention has been disclosed, it is apparent that variation in details of construction which have been illustrated and described may be resorted to without departing from the spirit and scope of the invention.

I claim:

1. A fish separator, comprising a trawl net having a forward opening for receiving fish and shrimp into said trawl net, a rearward escape opening in said trawl net, and fish separating means including means supplying pulses of electricity adjacent said rearward opening, said pulses being selected to repel shrimp from said rearward opening while having no effect on fish.

2. The combination according to claim 1 wherein said pulses have voltages of about ¾ to 1½ volts and a pulse rate of about 3–6 pulses per second.

3. A trawling system, comprising a trawl net in the form of a bag having a forward opening, said bag collecting via said opening a variety of undesirable sea animals and shrimp, an escape hatch located rearwardly of said bag, sea animal discriminating means including means for applying to at least one edge of said escape hatch pulses of electricity of about ¾ to 1½ volts occurring about 3–6 times per second, whereby said shrimp are repelled from said escape hatch and do not escape, but said undesirable sea animals pass through said sea hatch.

* * * * *